(12) United States Patent
Lin

(10) Patent No.: US 8,540,595 B1
(45) Date of Patent: Sep. 24, 2013

(54) BALL INFLATION VALVE

(75) Inventor: Mei Sun Lin, New Taipei (TW)

(73) Assignee: Long Way Enterprise Co., Ltd., New Taipei (TW)

( * ) Notice: Subject to any disclaimer, the term of this patent is extended or adjusted under 35 U.S.C. 154(b) by 32 days.

(21) Appl. No.: 13/430,667

(22) Filed: Mar. 26, 2012

(51) Int. Cl.
*A63B 41/02* (2006.01)

(52) U.S. Cl.
USPC .......................................... 473/610; 473/611

(58) Field of Classification Search
USPC .................................. 473/610, 611, 603–605
See application file for complete search history.

(56) References Cited

U.S. PATENT DOCUMENTS

| | | | | | |
|---|---|---|---|---|---|
| 1,951,565 | A | * | 3/1934 | Sonnett | 473/611 |
| 2,065,121 | A | * | 12/1936 | De Laney et al. | 473/610 |
| 2,183,900 | A | * | 12/1939 | Voit et al. | 137/223 |
| 2,600,862 | A | * | 6/1952 | Fenton | 473/610 |
| 4,311,307 | A | * | 1/1982 | Mizuno | 473/603 |
| 4,320,776 | A | * | 3/1982 | Yang | 473/610 |
| 5,915,407 | A | * | 6/1999 | West | 137/223 |
| 7,517,294 | B2 | * | 4/2009 | Tsai | 473/594 |
| 2003/0144096 | A1 | * | 7/2003 | Lee | 473/611 |
| 2004/0159350 | A1 | * | 8/2004 | Lai | 137/223 |
| 2011/0183791 | A1 | * | 7/2011 | Lo | 473/605 |
| 2012/0058846 | A1 | * | 3/2012 | Chou | 473/611 |

* cited by examiner

*Primary Examiner* — Steven Wong
(74) *Attorney, Agent, or Firm* — Rabin & Berdo, P.C.

(57) ABSTRACT

A ball inflation valve includes a valve body extended into an inflatable inner bladder of a ball and having an axial bore and an annular flange portion; a valve core partially held in the axial bore of the valve body and having an air hole; a canvas superimposing layer flatly superimposed on the annular flange portion of the valve body to locate around the valve core; and a protective top including a sleeve portion enclosing a length of the valve core exposed from the valve body and a locating flange portion radially outward extended from the sleeve portion to locate between a surface cover of the ball and the valve body and the valve core, so that any sulfide from the valve body and the valve core will attach to an inner side of the protective top without forming a yellowing smudge on the ball surface cover.

6 Claims, 6 Drawing Sheets

BALL INFLATION VALVE

FIELD OF THE INVENTION

The present invention relates to an inflation valve for balls, and more particularly to a ball inflation valve including a protective top located above a replaceable valve core of the ball inflation valve to isolate sulfide-made valve body and valve core from yellowing a surface cover of a ball.

BACKGROUND OF THE INVENTION

Currently, there are various kinds of balls available in the market, and balls with the most basic form are directly molded with rubber materials. To create different visual impression and touch of balls, to meet different requirements for use of balls, and to enable easy separation of one type of ball from others, the balls are usually provided on their surface covers with different recessed ribs or other surface textures. For example, a basketball has a plurality of grains and recessed ribs formed thereon; and a football is formed of a plurality of hexagonal leather covers to create a plurality of seams and grooves thereon. Generally speaking, most types of balls are air-inflated to get elasticity and the ability of bouncing.

Conventionally, a ball is inflated by compressing air into an inflatable inner bladder of the ball via an inflation valve installed on the ball. Please refer to FIG. 1. A conventional ball inflation valve 10 includes an air passage 11 partially extended into the inflatable inner bladder of a ball. The air passage 11 is provided at a center with an axially extended through hole 111 for communicating the inflatable inner bladder with air outside the ball. A locating portion 12 is radially outward extended from an outer surface of the air passage 11 for closely connecting to the inflatable inner bladder. The through hole 111 is normally in a closed state (not shown). To inflate the ball, an inflation needle is pierced through the through hole 111, so that an airway (not shown) is formed along the through hole 111.

The conventional ball inflation valve is usually made of a sulfide. Please refer to FIG. 2. When a surface cover 13 of the ball is in direct contact with the sulfide-made inflation valve 10, a yellowing smudge 14 will form in an area of the surface cover 13 adjoining the sulfide-made inflation valve 10. The yellowing smudge 14 will form even on a completely new ball and would have considerable influence on a consumer's desire for buying the ball. Therefore, it is necessary to improve the conventional ball inflation valve.

SUMMARY OF THE INVENTION

A primary object of the present invention is to provide a ball inflation valve that includes a protective top capable of isolating sulfide-made valve body and valve core of the ball inflation valve from contacting with and forming a yellowing smudge on a surface cover of a ball.

Another object of the present invention is to provide a ball inflation valve that includes a protective top having an opening with a rounded inner edge, so that, in case of a leaking ball, a valve core of the ball inflation valve can be conveniently extracted from a valve body via the rounded inner edge of the opening for replacement.

To achieve the above and other objects, the ball inflation valve according to the present invention is installed in between an inflatable inner bladder and a surface cover of a ball, and includes a valve body extended into and communicating with the inflatable inner bladder, a valve core partially held in the valve body, a canvas superimposing layer attached to a top of the valve body, and a protective top enclosing a length of the valve core exposed from the valve body and covering a top of the canvas superimposing layer above the valve body.

The valve body includes a first communicating tube portion extended into the inflatable inner bladder, and an annular flange portion radially outward extended from a top of the first communicating tube portion. The annular flange portion is fitly attached to an outer surface of the inflatable inner bladder, the first communicating tube portion internally defines an axial bore, and the axial bore internally includes an annular groove.

The valve core includes a second communicating tube portion corresponding to the axial bore in the first communicating tube portion and internally defines an air hole extending a full length of the valve core to communicate the inflatable inner bladder with a space outside of the ball, and a locating ring portion radially outward extended from an outer surface of the second communicating tube portion for fitly engaging with the annular groove in the axial bore of the first communicating tube portion.

The canvas superimposing layer includes an aperture for the second communicating tube portion to extend therethrough, and is flatly superimposed on a top of the annular flange portion of the valve body. The protective top includes a raised sleeve portion for fitting around a length of the valve core located outside the valve body, the sleeve portion has an upper end internally defining an opening corresponding to the air hole of the valve core and an interior defining a fitting space configured to match the shape and size of the length of the second communicating tube portion exposed from the valve body. A locating flange portion is radially outward extended from a lower end of the sleeve portion to be clamped in between the canvas superimposing layer of the ball inflation valve and the surface cover of the ball, and the locating flange portion has a covering area larger than that of the annular flange portion of the valve body for the protective top to completely cover the whole valve body located below the protective top.

The opening of the protective top has an inner diameter slightly smaller than an outer diameter of the second communicating tube portion of the valve core. And, the opening of the sleeve portion of the protective top has a rounded inner edge to enable convenient extraction of the valve core from the ball inflation valve for replacement without being hindered by the protective top enclosing the valve core.

In a preferred embodiment of the present invention, the ball further includes a middle canvas layer, and the ball inflation valve is installed in the ball with the middle canvas layer located between the surface cover of the ball and the locating flange portion of the protective top. In another preferred embodiment of the present invention, the ball further includes a middle canvas layer, and the ball inflation valve is installed in the ball with the middle canvas layer located between the locating flange portion of the protective top and the canvas superimposing layer. Further, the canvas superimposing layer has a shape and a size the same as those of the annular flange portion of the valve body.

The present invention is advantageously characterized in that a protective top having an opening is provided to locate around the valve core and on the valve body and is accordingly located between the inflatable inner bladder and the surface cover of a ball. Therefore, the valve body and the valve core do not directly contact with the surface cover of the ball, any sulfide from the valve core and the valve body is directly attached to an inner side of the protective top without forming a yellowing smudge on the surface cover of the ball, and the ball can be inflated or deflated via the valve body and the valve core without being hindered by the protective top. Moreover, since the opening on the protective top has a rounded inner edge, a damaged valve core causing leakage of the ball can be conveniently extracted from the valve body via the opening of the protective top for replacement.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
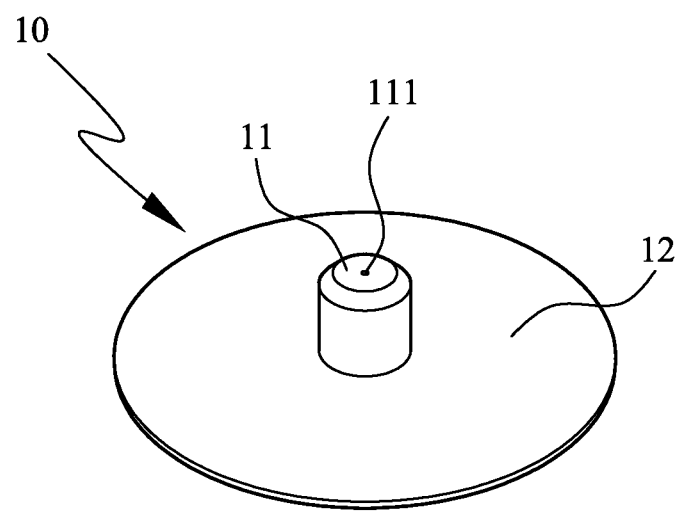
FIG. 1 is a perspective view of a prior art ball inflation valve.
Figure 2:
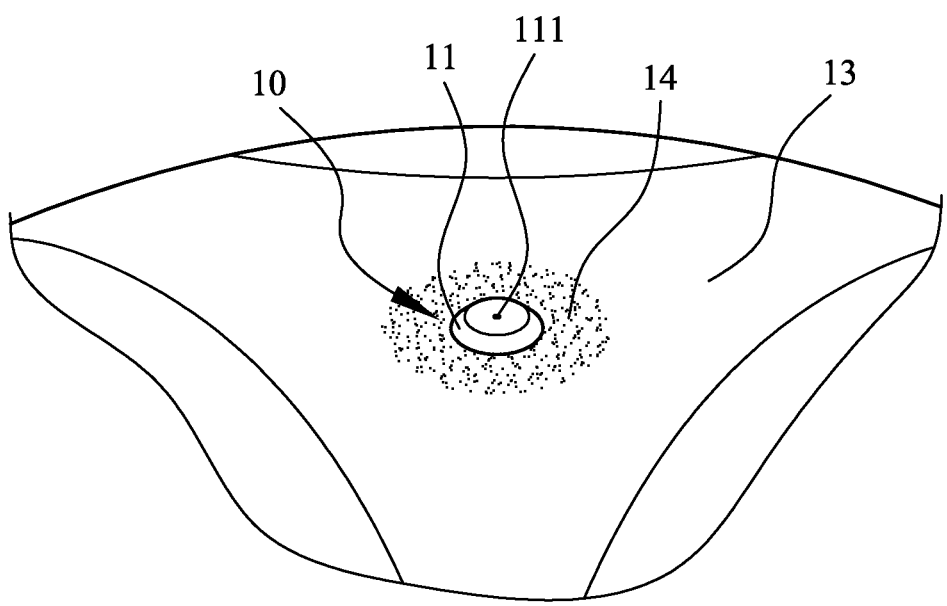
FIG. 2 is a fragmentary view of a ball showing a smudge on its surface cover around the prior art ball inflation valve.

The present invention will now be described with some preferred embodiments thereof and with reference to the accompanying drawings. For the purpose of easy to understand, elements that are the same in the preferred embodiments are denoted by the same reference numerals.

Figure 3:
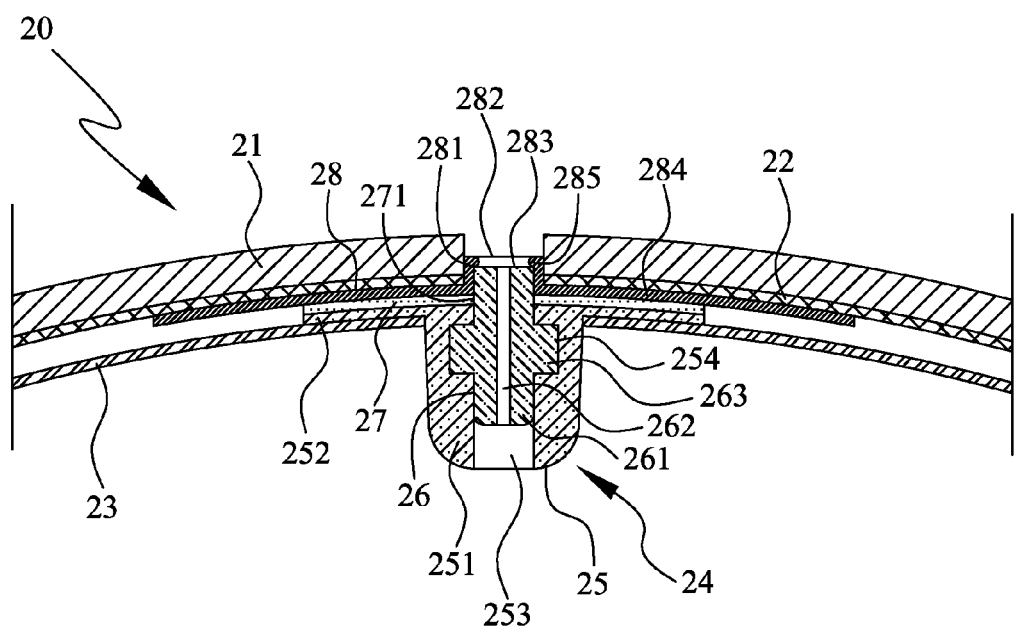
FIG. 3 is an assembled sectional view showing a ball inflation valve according to a first preferred embodiment of the present invention installed in a ball.
Figure 4:
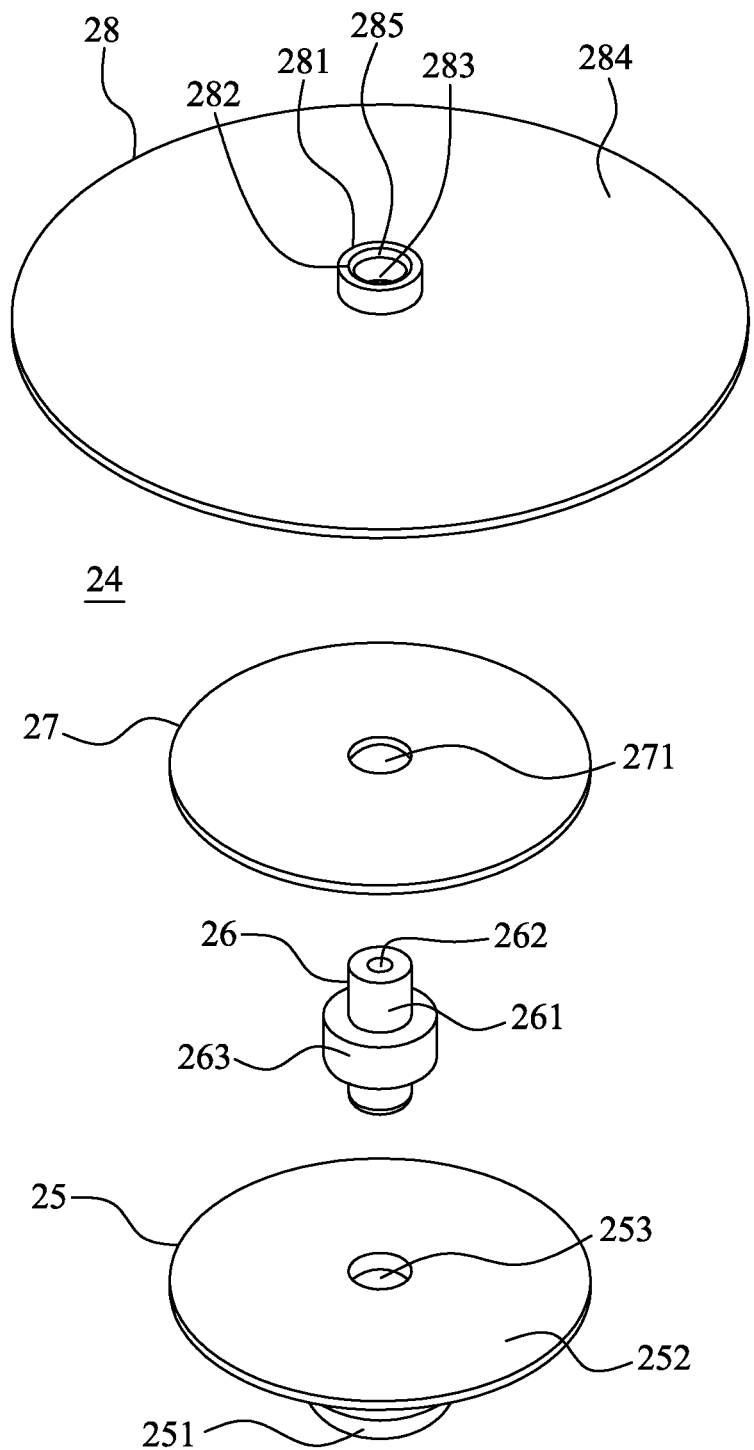
FIG. 4 is an exploded perspective view of the ball inflation valve according to the first preferred embodiment of the present invention.

Please refer to FIGS. 3 and 4 that are assembled sectional view and exploded perspective view, respectively, of a ball inflation valve 24 according to a first preferred embodiment of the present invention. As shown, the ball inflation valve 24 of the present invention is installed in a ball 20, which includes from outer to inner side a surface cover 21, a middle canvas layer 22, and an inflatable inner bladder 23. The ball inflation valve 24 of the present invention is installed in the ball 20 between the middle canvas layer 22 and the inflatable inner bladder 23.

The ball inflation valve 24 mainly includes a valve body 25, a valve core 26, a canvas superimposing layer 27, and a protective top 28. The valve body 25 is extended through and held in a hole formed on one side of the inflatable inner bladder 23 while being communicable with the hole. The valve core 26 is partially extended into and located in the valve body 25, such that an inflation needle (not shown) can be extended into the valve core 26 for inflating or deflating the inflatable inner bladder 23. The canvas superimposing layer 27 is directly laid on a top of the valve body 25 with the valve core 26 extending therethrough. Finally, the protective top 28 is laid on the canvas superimposing layer 27 around the valve core 26, so as to isolate the valve body 25 and the valve core 26 from direct contacting with the surface cover 21 and effectively prevent the surface cover 21 of the ball 20 from forming a yellowing smudge thereon.

In the illustrated first preferred embodiment, the valve body 25 includes a first communicating tube portion 251 extended into the inflatable inner bladder 23, and an annular flange portion 252 radially outward extended from a top of the first communicating tube portion 251. The annular flange portion 252 is fitly attached to an outer surface of the inflatable inner bladder 23. The first communicating tube portion 251 internally defines an axial bore 253, via which the inflatable inner bladder 23 communicates with a space outside the ball 20. And, the axial bore 253 internally includes an annular groove 254 for engaging with the valve core 26.

The valve core 26 includes a second communicating tube portion 261 corresponding to the axial bore 253 in the valve body 25, such that the second communicating tube portion 261 is press-fitted in the first communicating tube portion 251. Further, the second communicating tube portion 261 internally defines an air hole 262 extending a full length thereof to communicate the inflatable inner bladder 23 with the space outside the ball 20, so that an inflation needle (not shown) can be inserted into the air hole 262 to inflate or deflate the ball 20. A locating ring portion 263 corresponding to the annular groove 254 is radially outward extended from an outer surface of the second communicating tube portion 261, so that the valve core 26 is fitted in the valve body 25 with the locating ring portion 263 engaged with the annular groove 254, ensuring that the valve core 26 is not easily separated from the valve body 25 under the internal pressure or the vibration of the ball 20.

The canvas superimposing layer 27 is configured to have shape and size identical to those of the annular flange portion 252 of the valve body 25, and has an aperture 271 for the second communicating tube portion 261 to extend therethrough. And, the canvas superimposing layer 27 is flatly superimposed on a top of the annular flange portion 252.

The protective top 28 includes a raised sleeve portion 281 for fitting around a length of the valve core 26 located outside the valve body 25. The sleeve portion 281 has an upper end internally defining an opening 282 corresponding to the air hole 262 of the valve core 26, and an interior defining a fitting space 283 configured to match the shape and size of the length of the second communicating tube portion 261 exposed from the valve body 25. Thus, the protective top 28 covering the valve body 25 and enclosing the valve core 26 does not form a hindrance to the inflation or deflation of the ball 20 via the valve core 26. The protective top 28 further includes a locating flange portion 284 radially outward extended from a lower end of the sleeve portion 281 to be clamped in between the canvas superimposing layer 27 of the ball inflation valve 24 and the middle canvas layer 23 of the ball 20. The locating flange portion 284 has a covering area larger than that of the annular flange portion 252, so that the protective top 28 is able to completely cover the whole valve body 25 and the valve core 26.

With the larger protective top 28 located above the valve body 25 and around the valve core 26, any sulfide from the valve body 25 or the valve core 26 will directly attach to an inner side of the protective top 28. Therefore, the undesired yellowing smudge externally formed on the surface cover 21 of the ball 20 can be effectively eliminated.

Figure 5:
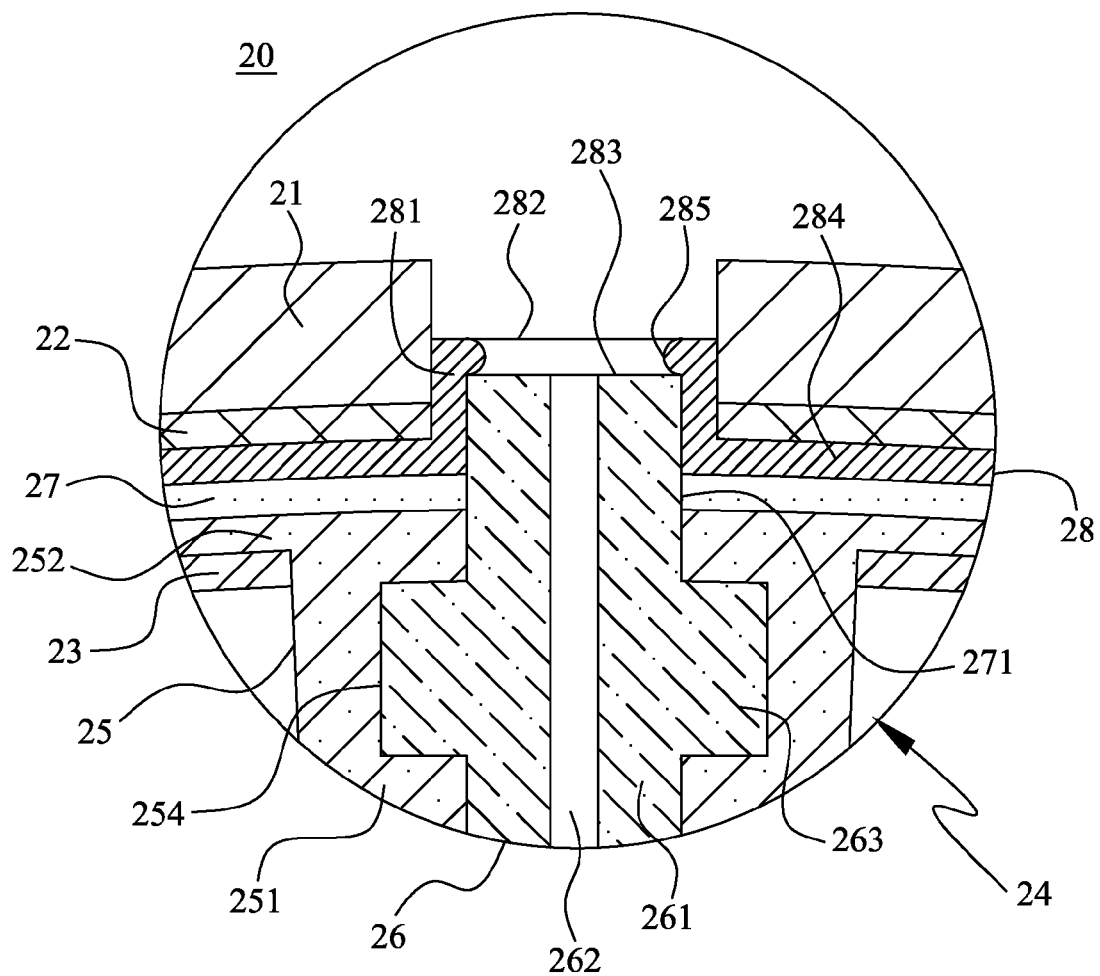
FIG. 5 is an enlarged fragmentary view of the ball inflation valve of FIG. 3.

Please refer to FIG. 5 that is a fragmentary enlarged view of FIG. 3. In an operable embodiment of the present invention, the opening 282 on the protective top 28 has a diameter slightly smaller than an outer diameter of the second communicating tube portion 261 of the valve core 26. Moreover, the opening 282 of the sleeve portion 281 has a rounded inner edge 285 to enable convenient extraction of the valve core 26 via the protective top 28 for replacement. Therefore, when the valve core 26 inserted in the valve body 25 and enclosed in the protective top 28 is worn-out or damaged to cause leakage of the ball 20, the valve core 26 can still be conveniently replaced using a suitable extraction tool.

Figure 6:
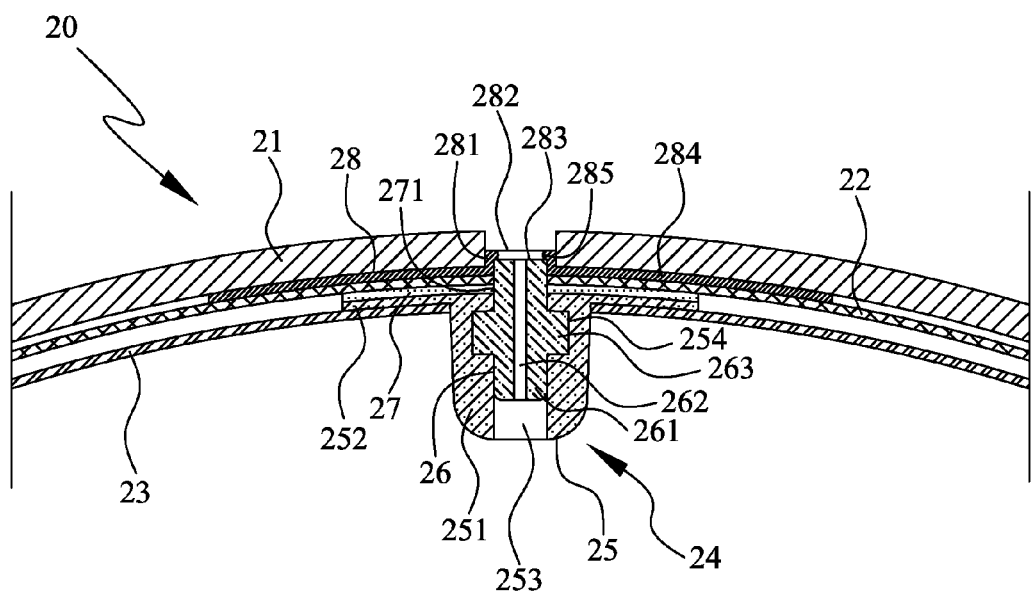
FIG. 6 is an assembled sectional view showing a ball inflation valve according to a second preferred embodiment of the present invention installed in a ball.

Please refer to FIG. 6 that is an assembled sectional view of a ball inflation valve 24 according to a second preferred embodiment of the present invention. As shown, the second preferred embodiment is generally structurally similar to the first preferred embodiment, except that the protective top 28 in the second preferred embodiment is clamped in between the middle canvas layer 22 and the surface cover 21 of the ball 20. More specifically, in the second preferred embodiment, the middle canvas layer 22 of the ball 20 is located around the valve core 26 to contact with a top of the canvas superimposing layer 27.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A ball inflation valve installed in between an inflatable inner bladder and a surface cover of a ball, comprising:

a valve body being extended into and communicable with the inflatable inner bladder; the valve body including a first communicating tube portion extended into the inflatable inner bladder, and an annular flange portion radially outward extended from a top of the first communicating tube portion; the annular flange portion being fitly attached to an outer surface of the inflatable inner bladder, the first communicating tube portion internally defining an axial bore, and the axial bore internally including an annular groove;

a valve core being partially extended into and held in the valve body; the valve core including a second communicating tube portion corresponding to the axial bore in the first communicating tube portion and internally defining an air hole extending a full length of the valve core to communicate the inflatable inner bladder with a space outside of the ball, and a locating ring portion radially outward extended from an outer surface of the second communicating tube portion for fitly engaging with the annular groove in the axial bore of the first communicating tube portion;

a canvas superimposing layer including an aperture for the second communicating tube portion to extend therethrough, and being flatly superimposed on a top of the annular flange portion of the valve body; and a protective top including:

a raised sleeve portion for fitting around a length of the valve core located outside the valve body, the sleeve portion having an upper end internally defining an opening corresponding to the air hole of the valve core and an interior defining a fitting space configured to match shape and size of the length of the second communicating tube portion exposed from the valve body; and a locating flange portion radially outward extended from a lower end of the sleeve portion to be clamped in between the canvas superimposing layer of the ball inflation valve and the surface cover of the ball, and the locating flange portion having a covering area larger than that of the annular flange portion of the valve body.

2. The ball inflation valve as claimed in claim 1, wherein the opening of the protective top has an inner diameter slightly smaller than an outer diameter of the second communicating tube portion of the valve core.

3. The ball inflation valve as claimed in claim 2, wherein the opening of the sleeve portion of the protective top has a rounded inner edge to enable convenient extraction of the valve core from the ball inflation valve via the protective top for replacement.

4. The ball inflation valve as claimed in claim 1, wherein the ball further includes a middle canvas layer, and the ball inflation valve is installed in the ball with the middle canvas layer located between the surface cover of the ball and the locating flange portion of the protective top.

5. The ball inflation valve as claimed in claim 1, wherein the ball further includes a middle canvas layer, and the ball inflation valve is installed in the ball with the middle canvas layer located between the locating flange portion of the protective top and the canvas superimposing layer.

6. The ball inflation valve as claimed in claim 1, wherein the canvas superimposing layer has a shape and a size the same as those of the annular flange portion of the valve body.

\* \* \* \* \*